United States Patent
O'Brien et al.

(10) Patent No.: US 9,646,440 B2
(45) Date of Patent: May 9, 2017

(54) VEHICLE REMOTE FUNCTION SYSTEM AND METHOD FOR DETERMINING VEHICLE FOB LOCATIONS USING ADAPTIVE FILTERING

(71) Applicant: Lear Corporation, Southfield, MI (US)

(72) Inventors: Thomas O'Brien, Troy, MI (US); Jason G. Bauman, Huntington Woods, MI (US); Jian Ye, Troy, MI (US)

(73) Assignee: Lear Corporation, Southfield, MI (US)

( * ) Notice: Subject to any disclaimer, the term of this patent is extended or adjusted under 35 U.S.C. 154(b) by 73 days.

(21) Appl. No.: 14/178,340

(22) Filed: Feb. 12, 2014

(65) Prior Publication Data

US 2014/0253288 A1 Sep. 11, 2014

Related U.S. Application Data

(60) Provisional application No. 61/774,832, filed on Mar. 8, 2013, provisional application No. 61/788,760, filed on Mar. 15, 2013.

(51) Int. Cl.
*G07C 9/00* (2006.01)

(52) U.S. Cl.
CPC ........... *G07C 9/00309* (2013.01); *G07C 2009/00793* (2013.01); *G07C 2209/64* (2013.01)

(58) Field of Classification Search
CPC ...... G07C 9/00309; G07C 2009/00793; G07C 2209/64
See application file for complete search history.

(56) References Cited

U.S. PATENT DOCUMENTS

| 5,051,751 A | * | 9/1991 | Gray | .......... H03H 17/0257 |
| | | | | 342/107 |
| 5,572,555 A | * | 11/1996 | Soenen | .......... G07C 9/00182 |
| | | | | 375/237 |

(Continued)

FOREIGN PATENT DOCUMENTS

| CN | 1900654 A | 1/2007 |
| CN | 102104435 A | 6/2011 |

(Continued)

OTHER PUBLICATIONS

Notice of Allowance for U.S. Appl. No. 13/923,522 dated Sep. 14, 2015.

(Continued)

*Primary Examiner* — Brian Miller
(74) *Attorney, Agent, or Firm* — Brooks Kushman P.C.

(57) ABSTRACT

A vehicle remote function system is provided for determining locations of a fob relative to a vehicle. The system may include a controller configured for communication with antennas mounted at different locations in the vehicle, the controller for use in determining locations of the fob based on ultra-wide band wireless signals transmitted between the antennas and the fob. The controller is configured to use a first filtering of the wireless signals to determine an initial location of the fob, and a second filtering of the wireless signals to determine a subsequent location of the fob. A method is also provided which may include transmitting ultra-wide band wireless signals between the fob and antennas mounted in the vehicle, using a first filtering of the wireless signals to determine an initial location of the fob, and using a second filtering of the wireless signals to determine a subsequent location of the fob.

21 Claims, 2 Drawing Sheets

(56) References Cited

U.S. PATENT DOCUMENTS

| | | | |
|---|---|---|---|
| 5,794,155 A * | 8/1998 | Andresen | H04B 7/18558 342/358 |
| 5,832,046 A * | 11/1998 | Li | H04L 7/0054 375/326 |
| 5,867,411 A * | 2/1999 | Kumar | G01S 19/04 375/232 |
| 5,929,769 A | 7/1999 | Garnault | |
| 6,208,239 B1 * | 3/2001 | Muller | B60R 25/24 340/10.1 |
| 6,385,542 B1 | 5/2002 | Millington | |
| 6,552,649 B1 | 4/2003 | Okada et al. | |
| 6,580,353 B1 | 6/2003 | Geber et al. | |
| 7,071,817 B2 * | 7/2006 | Haselsteiner | B60R 25/24 340/426.28 |
| 7,496,204 B2 | 2/2009 | Suzuki | |
| 7,705,710 B2 | 4/2010 | Hermann | |
| 7,843,318 B2 | 11/2010 | Funayose et al. | |
| 7,889,096 B2 * | 2/2011 | Breed | G08C 17/00 340/10.1 |
| 8,175,983 B2 * | 5/2012 | Okada | B60C 23/0408 706/12 |
| 8,232,863 B2 * | 7/2012 | Nakajima | B60R 25/245 340/5.61 |
| 8,248,233 B2 * | 8/2012 | Silverman | G01S 5/0294 340/539.13 |
| 8,284,020 B2 | 10/2012 | Ghabra et al. | |
| 8,319,605 B2 * | 11/2012 | Hassan | G01C 17/38 340/10.2 |
| 8,319,616 B2 | 11/2012 | Girard, III et al. | |
| 8,344,850 B2 | 1/2013 | Girard, III et al. | |
| 8,373,581 B2 * | 2/2013 | Hassan | G01C 17/38 340/426.18 |
| 8,427,276 B2 * | 4/2013 | McBride | B60R 25/245 340/5.64 |
| 8,560,492 B2 * | 10/2013 | Yuan | G05B 23/0221 706/62 |
| 8,838,481 B2 * | 9/2014 | Moshfeghi | G01S 19/48 235/380 |
| 8,872,620 B2 | 10/2014 | Higemoto et al. | |
| 8,935,052 B2 * | 1/2015 | Hermann | B60R 25/20 701/302 |
| 9,161,175 B1 * | 10/2015 | Smith | G01S 19/48 |
| 2007/0018799 A1 * | 1/2007 | Funayose | B60R 25/00 340/426.11 |
| 2007/0090965 A1 | 4/2007 | McCall | |
| 2007/0146120 A1 | 6/2007 | Kachouh | |
| 2007/0162191 A1 | 7/2007 | Matsubara et al. | |
| 2007/0222746 A1 | 9/2007 | LeVine | |
| 2008/0232431 A1 * | 9/2008 | Sanji | B60R 25/24 375/130 |
| 2009/0143923 A1 * | 6/2009 | Breed | G08G 1/205 701/1 |
| 2009/0289759 A1 | 11/2009 | Tsuchiya et al. | |
| 2010/0033298 A1 | 2/2010 | Kaihori et al. | |
| 2010/0076622 A1 * | 3/2010 | Dickerhoof | B60R 25/24 701/2 |
| 2010/0097239 A1 | 4/2010 | Campbell | |
| 2010/0148947 A1 | 6/2010 | Morgan et al. | |
| 2010/0171642 A1 | 7/2010 | Hassan et al. | |
| 2010/0308961 A1 | 12/2010 | Ghabra | |
| 2011/0109447 A1 | 5/2011 | Saguchi | |
| 2011/0218709 A1 | 9/2011 | Hermann | |
| 2011/0242303 A1 | 10/2011 | Giraud et al. | |
| 2011/0254503 A1 * | 10/2011 | Widmer | B60L 11/182 320/108 |
| 2011/0257973 A1 | 10/2011 | Chutorash et al. | |
| 2011/0309922 A1 | 12/2011 | Ghabra et al. | |
| 2012/0092129 A1 | 4/2012 | Lickfelt | |
| 2012/0158253 A1 | 6/2012 | Kroemke et al. | |
| 2012/0218128 A1 | 8/2012 | Tieman et al. | |
| 2012/0223810 A1 * | 9/2012 | Petrucci | G07C 9/00309 340/5.64 |
| 2012/0239248 A1 | 9/2012 | Bobbitt | |
| 2012/0262340 A1 | 10/2012 | Hassan et al. | |
| 2012/0282906 A1 | 11/2012 | Frye et al. | |
| 2012/0286926 A1 | 11/2012 | Higemoto et al. | |
| 2013/0342379 A1 * | 12/2013 | Bauman | G01S 13/0209 342/21 |
| 2014/0136024 A1 | 5/2014 | Herthan | |
| 2014/0253287 A1 | 9/2014 | Bauman et al. | |
| 2014/0253288 A1 | 9/2014 | O'Brien et al. | |
| 2015/0258962 A1 | 9/2015 | Khanu | |
| 2015/0291126 A1 | 10/2015 | Nicholls et al. | |

FOREIGN PATENT DOCUMENTS

| | | |
|---|---|---|
| CN | 102398566 A | 4/2012 |
| CN | 102602363 A | 7/2012 |
| CN | 102703516 A | 10/2012 |
| CN | 102758567 A | 10/2012 |
| CN | 104903157 A | 9/2015 |
| DE | 69913607 T2 | 9/2004 |
| DE | 10341286 A1 | 4/2005 |
| DE | 102006037237 A1 | 2/2008 |
| DE | 10 2010 063 702 A1 | 6/2010 |
| DE | 102012203327 A1 | 9/2012 |
| FR | 2934223 A3 | 1/2010 |
| GB | 2498837 A | 7/2013 |
| GB | 2505287 A | 2/2014 |
| GB | 2509579 A | 7/2014 |
| JP | 2006299408 A | 11/2006 |
| JP | 2008231734 A | 10/2008 |
| WO | 2005024734 | 3/2005 |
| WO | 2007070739 A2 | 6/2007 |
| WO | 2007073969 | 7/2007 |
| WO | 2013010643 A1 | 1/2013 |

OTHER PUBLICATIONS

United Kingdom Patent Office, Combined Search and Examination Report for the Great Britain Patent Application No. GB1403658.6 mailed May 20, 2014.
Bloecher, Hans Ludwig et al., Trends in Automotive RF Wireless Applications and their Electromagnetic Spectrum Requirements, DaimlerChrysler AG, Research & Technology, 2005.
United States Patent and Trademark Office, Non-Final Office Action mailed Apr. 14, 2015 for U.S. Appl. No. 13/923,522.
United States Patent and Trademark Office, Final Office Action mailed Jul. 28, 2015 for U.S. Appl. No. 13/923,522.
Notice of Allowance for U.S. Appl. No. 13/923,522 dated Jan. 11, 2016.
United States Patent and Trademark Office, Final Office Action for U.S. Appl. No. 14/178,324 dated May 16, 2016.
United States Patent and Trademark Office, non-final Office Action for U.S. Appl. No. 13/923,522 dated Apr. 14, 2015.
United States Patent and Trademark Office, final Office Action for U.S. Appl. No. 13/923,522 dated Jul. 28, 2015.
United States Patent and Trademark Office, non-final Office Action for U.S. Appl. No. 14/178,324 dated Dec. 2, 2015.
United States Patent and Trademark Office, non-final Office Action for U.S. Appl. No. 14/178,324 dated Dec. 21, 2016.
United States Patent and Trademark Office, Notice of Allowance for U.S. Appl. No. 13/923,522 dated Jan. 12, 2017.
U.S. Patent and Trademark Office, non-final Office Action for U.S. Appl. No. 13/923,522 dated Mar. 29, 2017.

* cited by examiner

-- Prior Art --

VEHICLE REMOTE FUNCTION SYSTEM AND METHOD FOR DETERMINING VEHICLE FOB LOCATIONS USING ADAPTIVE FILTERING

CROSS-REFERENCE TO RELATED APPLICATIONS

The present application claims the benefit of U.S. Provisional Patent Application No. 61/774,832 filed on Mar. 8, 2013, and U.S. Provisional Patent Application No. 61/788,760 filed on Mar. 15, 2013, the disclosures of which are incorporated in their entirety by reference herein.

TECHNICAL FIELD

The following relates to a vehicle remote function system and a method for determining locations of a fob relative to a vehicle using adaptive filtering of ultra-wide band wireless signals.

BACKGROUND

Automotive vehicles may include passive entry systems that allow a user to access and start a vehicle just by holding a key, key fob or card. In operation, such systems may perform and/or enable vehicle access and vehicle start functions based on a determined location of the key in or around the vehicle.

To facilitate determining key location, the key, key fob or card may be equipped with a transceiver with one or more antennas, and the passive entry system may employ one or more transceivers with multiple antennas positioned at different locations in the vehicle. The passive entry system may also include an Electronic Control Unit (ECU) or controller having a decision based algorithm that determines key location based on the transmission of radio frequency (RF) or low frequency (LF) signals (e.g., 125 kHz) between the key antenna and the vehicle based antennas.

Current passive entry systems use low frequency (LF) antennas located in the vehicle door handles and trunk. Such systems provide relatively small, concentrated lock/unlock zones just around the individual doors and trunk areas. As previously noted, the locking/unlocking functions occur as a result of wireless communication with a key fob.

As a result, there exists a need for a vehicle remote function system and a method for determining locations of the fob more precisely relative to the vehicle. Such a system and method would determine fob locations inside and/or outside the vehicle using adaptive filtering of ultra-wide band wireless signals communicated between the fob and vehicle mounted antennas.

SUMMARY

According to one embodiment disclosed herein, a vehicle remote function system is provided for determining locations of a fob relative to a vehicle. The system may comprise a controller adapted to be mounted in the vehicle and configured for communication with a plurality of antennas mounted at different locations in the vehicle, the controller for use in determining locations of the fob based on ultra-wide band wireless signals transmitted between the antennas and the fob. The controller is configured to use a first filtering of the wireless signals to determine an initial location of the fob, and to use a second filtering of the wireless signals to determine a subsequent location of the fob.

According to another embodiment disclosed herein, a method is provided for use in a vehicle remote function system, the method for determining a location of a fob relative to a vehicle. The method may comprise transmitting ultra-wide band wireless signals between the fob and a plurality of antennas mounted in the vehicle, using a first filtering of the wireless signals to determine an initial location of the fob, and using a second filtering of the wireless signals to determine a subsequent location of the fob.

A detailed description of these embodiments is set forth below together with accompanying drawings.

DETAILED DESCRIPTION

As required, detailed embodiments are disclosed herein. However, it is to be understood that the disclosed embodiments are merely exemplary and that various and alternative forms may be employed. The embodiments are included in order to explain principles of the disclosure and not to limit the scope thereof, which is defined by the appended claims. Details from two or more of the embodiments may be combined with each other. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

Figure 1:
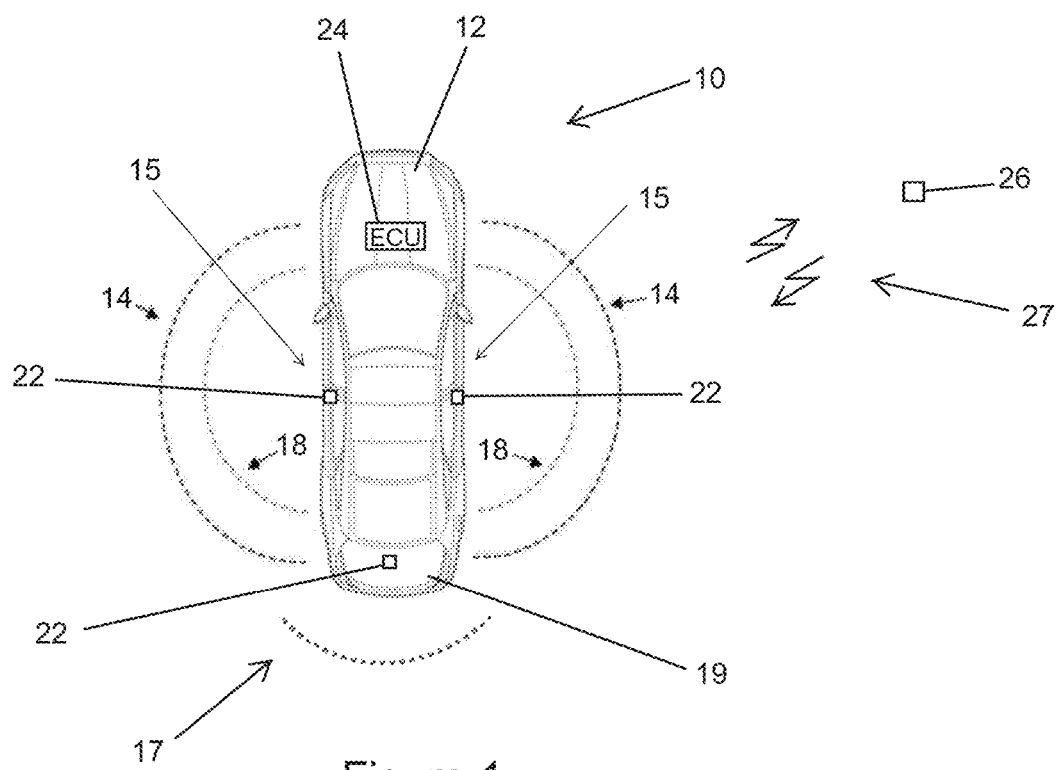
FIG. 1 is a simplified, exemplary diagram of a prior art passive entry system, including coverage zones.
Figure 2:
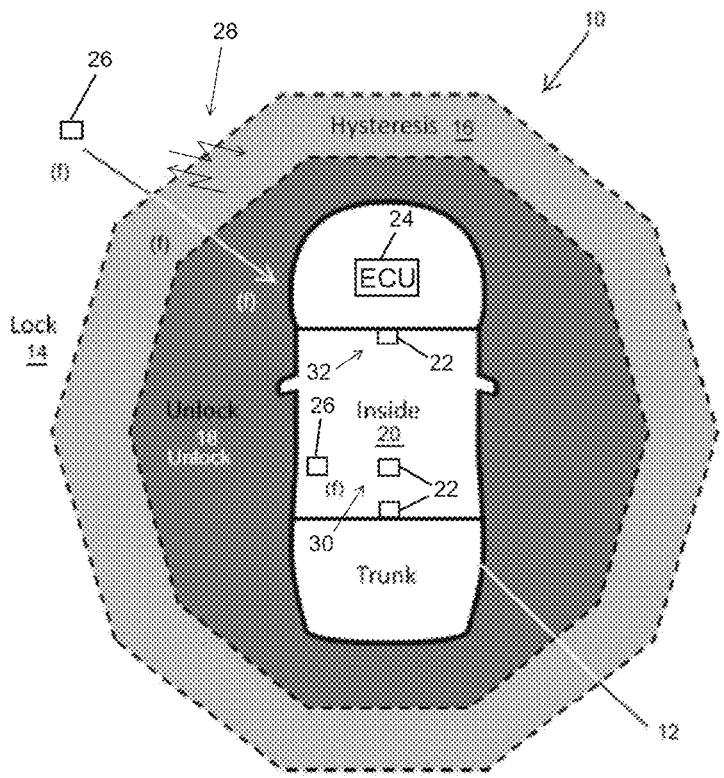
FIG. 2 is a simplified, exemplary diagram of a vehicle remote function system, including exemplary coverage zones, for determining locations of a fob relative to a vehicle using adaptive filtering of ultra-wide band wireless signals.
Figure 3:
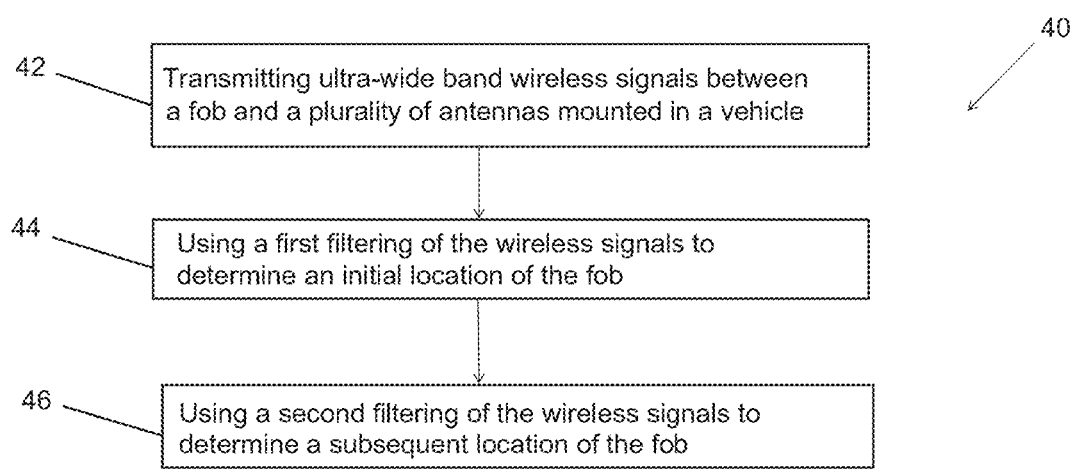
FIG. 3 is a simplified, exemplary flowchart of a method for determining locations of a fob relative to a vehicle using adaptive filtering of ultra-wide band wireless for use in a vehicle remote function system.

With reference to FIGS. 1-3, various embodiments of the method and system disclosed herein are shown and described. For ease of illustration and to facilitate understanding, similar reference numerals have been used throughout the following description to denote similar elements, parts, items or features in the drawings, where applicable.

As described previously, automotive vehicles may include passive entry systems that allow a user to access and start a vehicle just by holding a key, key fob or card. In operation, such systems may perform and/or enable vehicle access and vehicle start functions based on a determined location of the key in or around the vehicle. To facilitate determining key location, the key, key fob or card may be equipped with a transceiver with one or more antennas, and the passive entry system may employ one or more transceivers with multiple antennas positioned at different locations in the vehicle. The passive entry system may also include an Electronic Control Unit (ECU) or controller having a decision based algorithm that determines key location based on the transmission of radio frequency (RF) or low frequency (LF) signals (e.g., 125 kHz) between the key antenna and the vehicle based antennas.

Current passive entry systems use low frequency (LF) antennas located in the vehicle door handles and trunk. Such systems provide relatively small, concentrated lock/unlock zones just around the individual doors and trunk areas. As previously noted, the locking/unlocking functions occur as a result of wireless communication with a key fob. Thus, there exists a need for a vehicle remote function system and a method for determining locations of a fob more precisely relative to a vehicle. Such a system and method would determine fob locations inside and/or outside the vehicle using adaptive filtering of ultra-wide band wireless signals communicated between the fob and vehicle mounted antennas.

FIG. 1 is a simplified, exemplary diagram of a prior art passive entry system 10 for a vehicle 12, including coverage zones 14, 18, 17. As seen therein, the applicable zones 14, 18, 17 are localized to areas around the doors 15 and trunk 19. Current passive entry systems 10 use low frequency (LF) antennas 22 located in the handles of the doors 15 and in the trunk 19, and that provide relatively small, concentrated lock/unlock zones 14, 18, 17 just around the individual doors 15 and the trunk 19. Locking/unlocking functions occur inside/outside the zones 14, 18, 17 as a result of wireless communication 27 of a vehicle-mounted controller or Electronic Control Unit (ECU) 24 with a key fob 26 via antennas 22.

For example, when the fob 26 is brought inside a range 18 of about 1.5 meters around the vehicle doors 15, an unlock command may be issued that results in the performance of a vehicle door unlock function or operation. When the fob 26 is taken outside a range 14 of about 2.0 meters around the vehicle doors 15, a lock command may be issued that results in the performance of a vehicle door lock function or operation. All other areas outside of these small zones 14, 18, 17 are "dead zones" where no locking or unlocking functions occur.

As previously described, the ECU or controller 24 determines the location of the key fob 26 based on the transmission of radio frequency (RF) or low frequency (LF) signals 27 (e.g., 125 kHz) between the antenna (not shown) of the fob 26 and the vehicle based antennas 22, typically by using the strength of the signals 27 to indicated range. The zones 14, 18, 17 created with the use of antennas 22 are three-dimensional and have a spherical shape, but also may be described as having a circular or arching shape in a cross-section of the zones 14, 18, 17 taken in a horizontal plane substantially parallel to the ground.

FIG. 2 is a simplified, exemplary diagram of a vehicle remote function system 10, including exemplary coverage zones 14, 16, 18 for determining a location of a fob 26 (*f*) relative to a vehicle 12 using adaptive filtering of ultra-wide band (UWB) wireless signals 28. The remote function system 10 shown in FIG. 2 and disclosed herein is able to locate the fob 26 more precisely around and/or in entire vehicle 12 using dynamic or adaptive filtering of the ultra-wide band wireless signals 28 transmitted between the fob 26 and antennas 22 located in the vehicle 12. Using ultra-wide band wireless technology, exemplary zones 14, 16, 18 may be custom tailored for individual vehicle needs and customer requirements.

The system 10 shown in FIG. 2 implements full lock and unlock zones 14, 18, as well as hysteresis zone 16, around the entire vehicle 12. Using a Kalman filter and/or other filters or filtering techniques, the controller or ECU 24 provides dynamic or adaptive filtering of the wireless signals 28 to more precisely locate the fob 26 in and/or around the vehicle 12. In particular, by using dynamic or adaptive filtering of wireless signals 28, more precise locating and tracking of the fob 26 in and out of zones 14, 16, 18, 20 may be provided in order to perform locking/unlocking functions relative to the location of the fob 26, such as performing an unlock operation when the fob 26 moves into zone 18, and a lock operation when the fob 26 moves out to zone 14.

Ultra-wide band (UWB) antennas 22 at various locations in/on the vehicle 12 can provide tailored lock/unlock zones 14, 18 around the entire vehicle 12, with locking/unlocking or other vehicle functions occurring inside/outside zones 14, 18 as a result of wireless communication via UWB signals 28 between the ECU 24 and the key fob 26. In that regard, and as used herein, an antenna 22 may be an internal antenna of an UWB transceiver unit, or an antenna in communication with a centrally located UWB transceiver, such as via coaxial cabling, which centrally located UWB transceiver may be provided as part of ECU 24.

The UWB antennas 22 may be positioned at different locations in/on the vehicle 12. As seen in FIG. 2, one antenna 22 may be located in the instrument panel area 32 of the vehicle 12, while other antennas 22 may be located in the headliner 30 of the vehicle 12. It should be noted, however, that any number of antennas 22 may be employed and may be positioned at any of a variety of locations in/on the vehicle 12.

While three substantially decagonal zones 14, 16, 18 are depicted in FIG. 2, any number of zones of other shapes and sizes/ranges may be employed or created. In that regard, the UWB system 10 of FIG. 2 permits as many zones to be created as desired, with each zone having any type of shape, size and/or location desired, including outside or inside 20 the vehicle 12, on one or both sides of the vehicle 12, and/or in front or back of the vehicle 12, which zones may or may not circumscribe, envelope or encompass the vehicle 12, in whole or in part, and may have any orientation.

For example, in contrast to the prior art passive entry system depicted in FIG. 1, which has spherical shaped zones 14, 16, 17, the vehicle remote function system 10 illustrated in FIG. 2 allows for zones 14, 16, 18 having sharp corners. The zones 14, 16, 18 may be three-dimensional prisms, having a substantially decagonal cross-section in a horizontal plane parallel to the ground. Other shapes, however, may alternatively be used for these or additional zones, which may be spheres, regular or uniform three-dimensional prisms, or irregular or non-uniform in shape or volume. As well, differently shaped zones may be provided for use in remotely performing different vehicle functions, such as an arched zone for a door unlock function, an octagonal zone for a door lock function, and a square zone for a trunk release function.

Such zones may also be located inside 20 or outside the vehicle 12, and may have any volume. For example, the zones 14, 16, 18 illustrated in FIG. 2 are located outside the vehicle 12 and encompass and/or have a volume greater than that of the vehicle 12. However, the system shown in FIG. 2 allows for zones that may be located outside the vehicle 12 on one side thereof, such as may be desired to allow a door unlock function only when the fob 26 approaches the vehicle 12 from one side.

The system 10 of FIG. 2 also allows for zones that may be located inside 20 the vehicle 12, in whole or in part, and that may have a relatively small volume, such as less than the volume of an average person. Such smaller zones located inside 20 the vehicle 12 may be used to determine the precise location of the fob 26 within the vehicle, such as in a vehicle glove box and/or for use in push-to-start systems.

The zones employed or created may also be provided for use in remote performance of other vehicle functions in addition to or instead of remote door lock/unlock or trunk release. For example, a combination of zones may be created outside the vehicle 12 which can be used to recognize gestures by a user as the fob 26 moves (which may include back and forth movement) between zones in order to perform remote engine start, headlight activation and/or any other type of vehicle function.

In a typical vehicle remote function system, a Kalman filter may be tuned and calibrated, with one calibration used for the entire system operation. However, due to the nature of a Passive Entry Passive Start (PEPS) application, performance requirements change based on the physical location of the fob 26 (f) in the system.

Referring still to FIG. 2, while the fob 26 (f) is far away from the vehicle 12 (such as in lock zone 14), low latency is important, but some location noise is acceptable. As the fob 26 (f) gets closer to the vehicle 12 (e.g., through hysteresis zone 16 to unlock zone 18), latency needs to remain low, but filtering must be more accurate. Tradeoffs may be considered when tuning the filter. As the fob 26 (f) moves inside 20 the vehicle 12, latency is no longer as important. Instead location accuracy is higher priority.

According to the system 10 of FIG. 2, more optimal performance of the system 10 may be achieved by adaptively or dynamically changing the filter calibration based on location of the fob 26. The number of filters and/or types of filters may also or alternatively be adaptively or dynamically changed. For example, a time averaging filter may be added before or after the Kalman filter, and/or another filter instead of the Kalman filter may be implemented. The filter(s) may also or alternatively be dynamically or adaptively changed based on the speed of the fob 26, the acceleration of the fob 26 (which may be calculated by the controller 24 or provided by an accelerometer (not shown) in the fob 26 and included in the UWB signals 28), a predicted movement vector for the fob 26 calculated by the controller 24, or other parameters.

With reference again to FIG. 2, a vehicle remote function system 10 is provided for determining locations of a fob 26 relative to a vehicle 12. The system 10 may comprise a controller 24 adapted to be mounted in the vehicle 12 and configured for communication with a plurality of antennas 22 mounted at different locations in the vehicle 12. The controller 24 is for use in determining locations of the fob 26 based on ultra-wide band wireless signals 28 transmitted between the antennas 22 and the fob 26. The controller 24 is configured to use a first filtering of the wireless signals 28 to determine an initial location of the fob 26, and to use a second filtering of the wireless signals 28 to determine a subsequent location of the fob 26.

In that regard, the controller 24 may be configured to select the second filtering based on the initial location determined for the fob 26. The controller 24 may also or alternatively be configured to determine a speed of the fob 26, and to select the second filtering based on the speed determined for the fob 26. The controller 24 may also or alternatively be configured to determine an acceleration of the fob 26, and to select the second filtering based on the acceleration determined for the fob 26. The controller 24 may also or alternatively be configured to select the second filtering based on acceleration information concerning the fob 26 included in the wireless signals 28, such as from an accelerometer (not shown) in the fob 26. The controller 24 may also or alternatively be configured to determine a predicted movement vector for the fob 26, and to select the second filtering based on the predicted movement vector determined for the fob 26.

According to the system 10 of FIG. 2, the first filtering may comprise a Kalman filter having a first calibration, and the second filtering may comprise a Kalman filtering having a second calibration. The first filtering may also or alternatively comprise a Kalman filter, and the second filtering may comprise a time averaging filter. The first filtering may also or alternatively comprise a Kalman filter, and the second filtering may comprise a time averaging filter and a Kalman filter. The first filtering may also or alternatively comprise a first number and/or type of filter(s), and the second filtering may comprise a second number and/or type of filter(s).

The system 10 may further comprise a plurality of antennas 22 adapted to be mounted at different locations in the vehicle 12. The plurality of antennas 22 may comprise an antenna 22 adapted to be mounted in a vehicle headliner 30 and an antenna 22 adapted to be mounted in a vehicle instrument panel area 32. As previously described, each antenna 22 is for use in transmitting and/or receiving ultra-wide band wireless signals 28 to and/or from the fob 26, which is also provided with an antenna and transmitter/transceiver (not shown). As also previously described, the system 10 may further comprise a fob 26 for use in transmitting and/or receiving ultra-wide band wireless signals 28 to and/or from the plurality of antennas 22.

As seen in FIG. 2, when the fob 26 is brought inside a first range 18 anywhere around the vehicle 12, an unlock command may be issued that results in the performance of a vehicle door unlock function or operation. When the fob 26 is taken outside a second range 14 anywhere around the vehicle 12, a lock command may be issued that results in the performance of a vehicle door lock function or operation.

Referring next to FIG. 3, a simplified, exemplary flowchart of a method 40 is shown for determining a location of a fob relative to a vehicle using ultra-wide band wireless signals, the method 40 for use in a vehicle remote function system, such as that described in connection with FIG. 2. As seen therein, the method 40 may comprise transmitting 42 ultra-wide band wireless signals between the fob and a plurality of antennas mounted in the vehicle, and using 44 a first filtering of the wireless signals to determine an initial location of the fob. The method may further comprise using 46 a second filtering of the wireless signals to determine a subsequent location of the fob.

According to the method 40, using 46 a second filtering may comprise selecting the second filtering based on the initial fob location determined. The method 40 may also or alternatively comprise determining a speed of the fob, and using 46 a second filtering may comprise selecting the second filtering based on the fob speed determined. Using 46 a second filtering may also or alternatively comprise selecting the second filtering based on an acceleration of the fob. The method 40 may also or alternatively comprise determining a predicted movement vector for the fob, and using 46 a second filtering may comprise selecting the second filtering based on the predicted movement vector determined.

Also according to the method 40, the first filtering may comprises a Kalman filter having a first calibration, and the second filtering may comprise a Kalman filtering having a second calibration. The first filtering may also or alternatively comprise a Kalman filter, and the second filtering comprises a time averaging filter. The first filtering may also or alternatively comprise a first number and/or type of filter(s), and the second filtering comprises a second number and/or type of filter(s).

The activities, functions or steps of the system 10 and method 40 for determining locations of a key fob 26 relative to a vehicle 12 described above may also be implemented in or as a computer readable medium having non-transitory computer executable instructions stored thereon for determining a location of a key fob for use in a vehicle remote function system. More specifically, the computer executable instructions stored on the computer readable medium may include instructions for performing any or all of the activities, functions or steps described above in connection with the system 10 or method 40 disclosed herein.

In that regard, the controller or ECU 24 may comprise an appropriately programmed processor or other hardware, software, or any combination thereof for performing the functions described herein, such as implementing a Kalman filter and/or other filters or filtering techniques. The controller or ECU 24 may also comprise a memory, which may provide the computer readable medium and have the computer executable instructions stored thereon described above.

As is readily apparent from the foregoing, a vehicle remote function system and a method have been described for determining locations of a fob more precisely relative to a vehicle. The embodiments of the system and method determine fob locations inside and/or outside the vehicle using adaptive filtering of ultra-wide band wireless signals communicated between the fob and vehicle mounted antennas While various embodiments of a vehicle remote function system and a method for determining locations of a key fob relative to a vehicle using adaptive filtering of ultra-wide band wireless signals have been illustrated and described herein, they are exemplary only and it is not intended that these embodiments illustrate and describe all those possible. Instead, the words used herein are words of description rather than limitation, and it is understood that various changes may be made to these embodiments without departing from the spirit and scope of the following claims.

What is claimed is:

1. A vehicle remote function system for determining locations of a fob relative to a vehicle, the system comprising:
   a controller adapted to be mounted in the vehicle and configured for communication with a plurality of antennas mounted at different locations in the vehicle, the controller for use in determining locations of the fob based on ultra-wide band wireless signals transmitted between the antennas and the fob;
   wherein the controller is configured to use a first filtering of the wireless signals to determine an initial location of the fob and control a vehicle function based on the initial fob location determined, and to use a second filtering of the wireless signals to determine a subsequent location of the fob and control a vehicle function based on the subsequent fob location determined, the second filtering of the wireless signals different than the first filtering of the wireless signals.

2. The system of claim 1 wherein the controller is further configured to select the second filtering based on the initial fob location determined.

3. The system of claim 1 wherein the controller is further configured to determine a speed of the fob, and to select the second filtering based on the fob speed determined.

4. The system of claim 1 wherein the controller is further configured to determine an acceleration of the fob, and to select the second filtering based on the fob acceleration determined.

5. The system of claim 1 wherein the controller is further configured to select the second filtering based on fob acceleration information in the wireless signals.

6. The system of claim 1 wherein the controller is further configured to determine a predicted movement vector for the fob, and to select the second filtering based on the predicted movement vector determined.

7. The system of claim 1 wherein the first filtering comprises a Kalman filter having a first calibration, and the second filtering comprises a Kalman filtering having a second calibration.

8. The system of claim 1 wherein the first filtering comprises a Kalman filter, and the second filtering comprises a time averaging filter.

9. The system of claim 1 wherein the first filtering comprises a Kalman filter, and the second filtering comprises both a time averaging filter and a Kalman filter.

10. The system of claim 1 wherein the first filtering comprises a first number and/or type of filter(s), and the second filtering comprises a second number and/or type of filter(s).

11. The system of claim 1 further comprising a plurality of antennas adapted to be mounted at different locations in the vehicle, each antenna for use in transmitting and/or receiving ultra-wide band wireless signals to and/or from the fob.

12. The system of claim 1 further comprising the fob for use in transmitting and/or receiving ultra-wide band wireless signals to and/or from the plurality of antennas.

13. A method for use in a vehicle remote function system, the method for determining a location of a fob relative to a vehicle, the method comprising:
   transmitting ultra-wide band wireless signals between the fob and a plurality of antennas mounted in the vehicle;
   using a first filtering of the wireless signals to determine an initial location of the fob and control a vehicle function based on the initial fob location determined; and
   using a second filtering of the wireless signals to determine a subsequent location of the fob and control a vehicle function based on the subsequent fob location determined, the second filtering of the wireless signals different than the first filtering of the wireless signals.

14. The method of claim 13 wherein using a second filtering comprises selecting the second filtering based on the initial fob location determined.

15. The method of claim 13 further comprising determining a speed of the fob, and wherein using a second filtering comprises selecting the second filtering based on the fob speed determined.

16. The method of claim 13 wherein using a second filtering comprises selecting the second filtering based on an acceleration of the fob.

17. The method of claim 13 further comprising determining a predicted movement vector for the fob, and wherein using a second filtering comprises selecting the second filtering based on the predicted movement vector determined.

18. The method of claim 13 wherein the first filtering comprises a Kalman filter having a first calibration, and the second filtering comprises a Kalman filtering having a second calibration.

19. The method of claim 13 wherein the first filtering comprises a Kalman filter, and the second filtering comprises a time averaging filter.

20. The method of claim 13 wherein the first filtering comprises a first number and/or type of filter(s), and the second filtering comprises a second number and/or type of filter(s).

21. A vehicle remote function system for determining locations of a fob relative to a vehicle, the system comprising:
- a controller adapted to be mounted in the vehicle and configured for communication with a plurality of antennas mounted at different locations in the vehicle, the controller for use in determining locations of the fob based on wireless signals transmitted between the antennas and the fob;
- wherein the controller is configured to use a first filtering of the wireless signals to determine an initial location of the fob and control a vehicle function based on the initial fob location determined, and to use a second filtering of the wireless signals to determine a subsequent location of the fob and control a vehicle function based on the subsequent fob location determined, the second filtering of the wireless signals different than the first filtering of the wireless signals.

* * * * *